ium and
United States Patent [19]

Brun et al.

[11] Patent Number: 5,075,270

[45] Date of Patent: Dec. 24, 1991

[54] PROCESS FOR PREPARING A CATALYST COMPONENT, RESULTANT CATALYST SYSTEM, AND PROCESS FOR SYNTHESIS OF POLYMERS

[75] Inventors: Claude Brun, Idron; Jean-Loup Lacombe, Lons, both of France

[73] Assignee: Atochem, Puteaux, France

[21] Appl. No.: 872,113

[22] Filed: Jun. 9, 1986

[30] Foreign Application Priority Data

Jun. 12, 1985 [FR] France ............................. 85/08908

[51] Int. Cl.$^5$ .................... C08F 4/654; C08F 10/00
[52] U.S. Cl. .................... 502/107; 502/104; 502/108; 502/109; 502/117; 502/119; 502/120; 502/132; 502/116; 526/125; 526/127; 526/129; 526/904; 526/352; 526/348.6; 526/901
[58] Field of Search .............. 502/107, 110, 109, 104, 502/114, 115, 116, 108

[56] References Cited

U.S. PATENT DOCUMENTS

| | | |
|---|---|---|
| 3,969,332 | 7/1976 | Gloriod et al. .................... 526/127 |
| 4,159,965 | 7/1979 | Sakurai et al. .................... 526/127 |
| 4,301,029 | 11/1981 | Count et al. .................... 526/127 |
| 4,319,011 | 3/1982 | Lowey et al. .................... 526/151 |
| 4,490,514 | 12/1984 | Hoff et al. .................... 526/127 |
| 4,536,484 | 8/1985 | Lacombe et al. .................... 526/125 |

FOREIGN PATENT DOCUMENTS

| | | |
|---|---|---|
| 1141091 | 2/1983 | Canada . |
| 127530 | 12/1984 | European Pat. Off. ............ 526/151 |
| 45-20110 | 7/1970 | Japan ................................. 526/127 |

*Primary Examiner*—Edward J. Smith

[57] ABSTRACT

A process for preparing a transition metal component for a catalyst system wherein a specified aluminosiloxane derivative is reacted with a monohalopenated, alkylated, or alkoxylated compound of magnesium and the reaction product is chlorinated and reacted with a transition metal; a catalyst system comprising such transition metal component and a cocatalyst selected from organometallic compounds of a metal of Groups I through III of the Periodic Table; and the process of synthesizing olefin homopolymers and copolymers utilizing such catalyst system.

24 Claims, No Drawings

PROCESS FOR PREPARING A CATALYST COMPONENT, RESULTANT CATALYST SYSTEM, AND PROCESS FOR SYNTHESIS OF POLYMERS

BACKGROUND OF THE INVENTION

The present invention pertains to a process for preparing a transition metal component for an olefin polymerization catalyst system. It also pertains to a catalyst system containing the said component as well as to a process for the synthesis of olefin polymers; the term "polymers" as used herein meaning both homopolymers and copolymers, in which the said catalyst system is used.

High-molecular-weight olefin polymers with low ash content are said to be prepared by polymerizing or copolymerizing olefins such as ethylene and its higher homologues, especially propene, 1-butene, 1-pentene, 4-methyl-1-pentene, 1-hexene and 1-octene by means of Ziegler-Natta catalyst systems, which result from the association of a transition metal component with a cocatalyst most often consisting of a hydrocarbyl aluminum or hydrocarbyl magnesium compound. The transition metal component is obtained, in general, by associating a transition metal compound, especially a titanium compound such as $TiCl_4$, $TiCl_3$ or an alkyl titanate, with a magnesium compound, especially a compound containing $MgCl_2$, and possibly an organic electron donor compound, and as the case may be, a porous organic or inorganic support.

A process for preparing such a transition metal component is known, which consists of first forming a reaction product, an organic magnesium-aluminum complex soluble in hydrocarbons by the reaction of a dialkyl magnesium or an alkyl magnesium halide with an alkyl aluminum or an aluminoxane compound in an inert hydrocarbon, after which the reaction product obtained is subjected to chlorination by HCl and the solid product resulting from this chlorination, which contains $MgCl_2$, is finally treated with a transition metal component such as an alkyl titanate.

In studying the above-described reaction scheme, which leads to the transition metal component, applicants found that it would be possible to obtain better results by replacing the alkyl aluminum or aluminoxane compound reacted with the dialkyl magnesium or alkyl magnesium halide by an aluminosiloxane derivative as will be defined below to form the reaction product, an organic magnesium-aluminum-silicon complex.

SUMMARY OF THE INVENTION

In fact, the use of an aluminosiloxane derivative leads to a more active transition metal component, which confers higher polymerization activity and ability on the catalyst system resulting from the association of this component with a cocatalyst. In addition, the aluminosiloxane derivative is less reactive than the alkyl aluminum compound, and it is therefore easier to handle. Compared with the aluminoxane compound, it offers the advantage of leading to polymerization products with a narrower molecular weight distribution.

The process according to the present invention for preparing a transition metal component for an olefin polymerization catalyst system is that in which an organic magnesium-aluminum-silicon reaction product is formed by the reaction of a monohalogenated alkyl or alkoxyl compound of magnesium with an organic aluminum-silicon compound in a liquid medium, after which the reaction product is subjected to chlorination and treatment with a transition metal compound selected from Ti, V, Zr, or Cr, and it is characterized in that at least one aluminosiloxane derivative of the following general formula is used as the organic aluminum-silicon compound

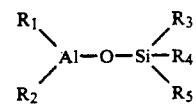

in which $R_1$, $R_2$, $R_3$, $R_4$, and $R_5$, which are identical or different, represent a $C_1$-$C_{12}$, and preferably a $C_1$-$C_6$, alkyl radical or hydrogen; with the understanding that the number of hydrogen atoms per mole of the derivative does not preferably exceed three.

The invention also comprises a catalyst system comprising this transition metal component and a cocatalyst and the process of polymerizing olefins utilizing the catalyst system as hereinafter set forth.

DETAILED DESCRIPTION

The magnesium compound, which is reacted with the aluminosiloxane compound, corresponds to the formula $Y_a\,Mg_m\,X_b$, in which Y is a $C_1$-$C_{12}$ and preferably $C_1$-$C_8$ alkyl or alkoxy radical, X is a radical Y or a halogen atom and preferably a chlorine atom, m is a number equal to or higher than one, and a higher than 0 so that $a+b=2\,m$.

Examples of such compounds are especially ethyl magnesium chloride, butyl magnesium chloride, di-n-butyl magnesium, diisobutyl magnesium, di-n-hexyl magnesium, di-n-octyl magnesium and $(C_4H_9)_3Mg_2(C_2H_5)$.

The reaction taking place between the magnesium compound of the formula $Y_a\,Mg_m\,X_b$ and the aluminosiloxane derivative is carried out in a liquid medium, which is inert with respect to the reagents or in the absence of such a medium if at least one of the said reagents is a liquid. The said inert medium may especially consist of an aliphatic hydrocarbon such as pentane, heptane, or hexane, an aromatic hydrocarbon such as benzene, toluene, xylene, or a cycloaliphatic hydrocarbon such as cyclohexane or methyl cyclohexane. The temperature used for this reaction is not critical and may vary, e.g., from $-40°$ C. to the boiling point of the liquid medium used under atmospheric pressure. The ratios of the magnesium compound of the formula $Y_a\,Mg_m\,X_b$ to the aluminosiloxane derivative, which are reacted with one another, are advantageously such that the ratio of the number of moles of the magnesium compound to the number of moles of the aluminosiloxane compound in the reaction medium is between 0.1 and 100 and preferably between 0.5 and 20.

According to the present invention, the organic magnesium-aluminum-silicon product resulting from the reaction of the $Y_a\,Mg_m\,X_b$ compound with the aluminosiloxane derivative is then subjected to chlorination and treatment with a transition metal compound selected from among Ti, V, Zr, and Cr.

The order in which the chlorination and the treatment with the transition metal compound are carried out is not critical. For example, the organic magnesium-aluminum-silicon reaction product can be subjected to chlorination, after which the product resulting from the chlorination can be treated with the transition metal compound. It is also possible to carry out the procedure in the reverse order, i.e., to treat the organic magnesium-aluminum-silicon product with the transition metal compound, after which the resulting product is subjected to chlorination.

The chlorination can be carried out by bringing the product to be chlorinated into direct contact with a chlorinating agent. However, to achieve satisfactory homogeneity, it is preferable to carry out the chlorination in an inert liquid medium, which may be similar to that used to prepare the organic magnesium-aluminum-silicon reaction product. The temperature used for the chlorination is not critical and it may vary, e.g., from 0° C. to 100°. Specifically chlorine, $SOCl_2$, $SiCl_4$, halogenated hydrocarbons such as t-butylchloride, 1-2dichloroethane, chlorobenzene, and preferably anhydrous HCl are suitable as the chlorinating agents. The quantity of the chlorinating agent is such that the ratio of the number of chlorine atoms supplied by the chlorinating agent to the number of magnesium atoms of the compound $Ya\ Mg_m\ Xb$ reacted with the aluminosiloxane derivative is higher than 2 and is more particularly between 2 and 100.

The treatment of the organic magnesium-aluminum-silicon product or the corresponding product resulting from the chlorination with the transition metal compound is also advantageously carried out in an inert liquid medium, which is, in particular, analogous to that used for the chlorination or for the preparation of the organic magnesium-aluminum-silicon compound. The said treatment is carried out at a temperature which may vary within rather broad limits and is especially between $-30°$ C. and 200° C. and preferably between 0° C. and 150° C. The compounds of Ti, V, Zr, and Cr, which are selected from among $TiCl_4$, $TiCl_3$, $VCl_4$, $VOCl_3$, $CrCl_3$, $CrO_3$, vanadium acetyl acetonate, chromium acetyl acetonate, $Ti(OR)_pCl(4-p)$ and $Zr(OR)_pCl(4-p)$, in which R is a $C_1$-$C_8$ alkyl radical and p is an integer ranging from 1 to 4, are preferably suitable for this treatment. It is possible to carry out the chlorination and the treatment with the transition metal compound in a single stage, selecting as the chlorinating agent a chloride of Ti, V, Zr, or Cr and especially $TiCl_4$.

According to a particular embodiment of the process according to the present invention, the transition metal component is prepared in the presence of a porous inorganic or organic support. The inorganic porous support may be selected, e.g., from the group formed by $SiO_2$, $Al_2O_3$, $TiO_2$, $ZrO_2$, zeolites and the mixed oxides containing $SiO_2$ and one or several metal oxides selected from among $ZrO_2$, $TiO_2$, MgO, and $Al_2O_3$.

The porous organic polymer support, in the dispersed state, can be selected from among the thermoplastic polymer powders of appropriate porosity and particle size, which said polymers are preferably free from reactive groups susceptible to react with the magnesium compound and/or the transition metal compound or to lead to crosslinking which may cause impairment of the properties of the support.

The preferred polymer supports are formed by thermoplastic polymer powders such as polystyrene and especially polyolefins, such as high-density polyethylene, low-density radical-type polyethylene, polypropylene and copolymers of ethylene with one of several $C_3$-$C_{12}$ alpha-olefins.

The support can be incorporated in the product formed by the reaction of the magnesium compound and the aluminosiloxane derivative; this incorporation can be carried out either during the formation of the reaction medium for the reaction between the said compounds, or in the course of the reaction, or when the reaction in which the formation of the organic magnesium-aluminum-silicon compound is complete. If the organic magnesium-aluminum-silicon product resulting from the reaction of the magnesium compound $Ya\ Mg_m\ Xb$ and the alumino-siloxane derivative is treated with a transition metal compound and the resulting product is then subjected to chlorination, the support can be incorporated in the medium originating from the treatment of the organic magnesium-aluminum-silicon compound with the transition metal compound before the chlorination stage. However, if the organic magnesium-aluminum-silicon product is subjected to chlorination and the product resulting from this chlorination is then treated with a transition metal compound, the product resulting from the chlorination is dissolved a solvent, e.g., tetrahydrofuran or alcohol such as methanol, and the support is impregnated with the solution obtained, after which the impregnated support is treated with the transition metal compound. It is also possible to associate the support (by co-crushing or mixing in a suspension in an inert liquid) with the product obtained at the end of the chlorination stage and the stage of treatment with the transition metal compound which is the last stage in the process. Finally, it is possible to dissolve the product obtained at the end of the said last stage in a solvent, especially tetrahydrofuran or alcohol, such as methanol and to impregnate the support with the resulting solution.

An electron donor consisting of a Lewis base or an electron acceptor compound may also be associated with the transition metal component. This can be carried out directly by mixing at the end of the preparation of the said component. It is also possible to incorporate the electron donor or electron acceptor in the transition metal component at any point of time within the process of preparing the said transition metal component, and especially in the course of the stage of the reaction of the magnesium compound $Ya\ Mg_m\ Xb$ with the aluminosiloxane derivative or at the end of the said stage and before the subsequent stage, which may be, as the case may be, the chlorination stage, the stage of treatment with the transition metal compound or the stage of addition of the support.

The electron donor may be a monofunctional or polyfunctional compound, advantageously selected from among the aliphatic or aromatic carboxylic acids and their alkyl esters, the aliphatic or cyclic ethers, ketones, vinyl esters, acryl derivatives, particularly alkyl acrylates or methacrylates and silanes. Such compounds as methyl para-toluate, ethyl benzoate, ethyl acetate or butyl acetate, ethyl ether, ethyl para-anisate, dibutyl phthalate, dioctyl phthalate, diisobutyl phthalate, tetrahydrofuran, dioxane, acetone, methyl isobutyl ketone, vinyl acetate, methyl methacrylate and phenyl triethoxysilane are especially suitable as electron donors.

The electron acceptor is a Lewis acid, preferably selected from among aluminum chloride, boron trifluoride, chloranil or alkyl aluminum and alkyl magnesium compounds.

The transition metal compound is used to prepare the transition metal component in such a quantity that the said component especially contains about 0.01 to 40 wt.% and preferably 0.1 to 20 wt.% transition metal.

If the support is used, its proportion may account for about 5% to 99.5% and preferably for 40% to 85% of the weight of the transition metal component which contains it.

The quantity of the electron donor that may be present may vary within rather broad limits. It is advantageously in such a range that the ratio of the number of magnesium atoms present in the transition metal component to the number of electron donor molecules is between about 0.5 and 200 and preferably between 1 and 100.

The quantity of the electron acceptors that may be present may vary within rather broad limits. It is advantageously in such a range that the molar ratio of the acceptor to the magnesium present in the transition metal component is between about 0.01 and 200 and preferably 0.1 and 50.

The transition metal component prepared in the above-described manner can be used in association with a cocatalyst selected from among the organometallic compounds of metals of Groups I through III of the Periodic Table of the Elements to form an appropriate catalyst system for the polymerization of olefins.

The cocatalyst associated with the transition metal component is selected, in particular, from among the organomagnesium compounds of the formula $Ya\,Mg_m\,Xb$, isoprenyl aluminum, aluminoxanes, the aluminosiloxane derivatives as defined above, and the organoaluminum compounds of the formula $Al(R')_q MrHs$, in which M is Cl or OR', R' is a $C_1$–$C_{16}$ and preferably $C_1$–$C_{12}$ alkyl radical, whereas q, r and s are numbers such that $1 \leq q \leq 3$, $0 \leq r \leq 2$ and $0 \leq s \leq 2$ with $q+r+s=3$. The cocatalyst is preferably selected from among isoprenyl aluminum, the organomagnesium compounds of the formula $Ya\,Mgm\,Xb$ and the organoaluminum compounds of the formula $AlR'''_x Cl(3-x)$, in which R''' is a $C_1$–$C_8$ alkyl radical and x is a number such that $1 \leq x \leq 3$. The examples of these compounds include triethyl aluminum, triisopropyl aluminum, triisobutyl aluminum, tri-n-hexyl aluminum, tri-n-octyl aluminum, diethyl aluminum chloride, isoprenyl aluminum dibutyl magnesium and di-n-hexyl magnesium.

The transition metal component and the cocatalyst are combined in such proportions that the ratio of the number of atoms of the metal from Groups I through III of the Periodic Table of the Elements contained in the cocatalyst to the number of transition metal atoms in the said component is between about 0.5 and 1,000 and preferably between 1 and 400.

The catalyst system may be formed by bringing the transition metal component into contact with the cocatalyst before being brought into contact with the olefins to be polymerized. The transition metal component and the cocatalyst may also be added separately in the olefin polymerization zone to form the catalyst system in situ.

Whether or not the transition metal component contains an electron donor, it is possible to add such a compound, selected from among the electron donors as defined above, to the catalyst system resulting from the association of the cocatalyst with the transition metal component, or even to the cocatalyst before it is brought into contact with the transition metal component to form the catalyst system, or the electron donor may be simultaneously brought into contact with the two other components of the catalyst system. The quantity of the electron donor is advantageously such that the ratio of the number of the atoms of the metal from Groups I through III of the Periodic Table of the Elements, and especially of aluminum or magnesium, which originate from the cocatalyst, to the number of electron donor molecules is between about 1 and 50.

The olefins which can be polymerized or copolymerized by means of the catalyst system resulting from the association of the transition metal component according to the present invention with the cocatalyst and possibly an electron donor as defined further above, include not only the $C_2$–$C_{18}$ hydrocarbons with a single ethylenic unsaturation, and particularly the $C_2$–$C_{18}$ monoolefins, such as ethylene, propene, 1-butene, 1-pentene, 1-hexene, 4-methyl-1-pentene, 1-octene, 1-decene, 1-dodecene, 1-tridecene, 1-hexadecene, 1-octadecene, but also the conjugated or nonconjugated dienes, especially butadiene, isoprene, 1,4-hexadiene, 1,5-hexadiene, vinyl norborene and ethylidene norbornene.

The above-mentioned catalyst system is particularly suitable for the polymerization of the $C_2$–$C_{12}$ monoolefins, e.g., ethylene, propene, 1-butene and 1-hexene.

For example, it is possible to polymerize a single $C_2$–$C_{12}$ monoolefin, e.g., ethylene, propene, 1-butene or 1-hexene, in contact with the catalyst system to produce the homopolymer corresponding to this monoolefin.

It is also possible to polymerize mixtures of at least two $C_2$–$C_{12}$ olefins in contact with the said catalyst system to prepare the copolymers of the said olefins. For example, it is possible to polymerize mixtures of ethylene and one or several $C_3$–$C_{12}$ alpha-olefins, which said mixtures contain, when they are in contact with the catalyst system, a total molar quantity of $C_3$–$C_{12}$ alpha-olefins between 0.1 and 90% and preferably between 1 and 60%.

It is also possible to polymerize mixtures of propene with ethylene and/or one or several $C_4$–$C_{12}$ alpha-olefins; the said mixtures contain, when in contact with the catalyst system, a total molar quantity of ethylene and/or $C_4$–$C_{12}$ alpha-olefins between 0.1 and 90% and preferably between 1 and 60%.

It is also possible to polymerize mixtures of ethylene and propene with or without other alpha-olefins or diolefins, the mixtures being such that the molar ratio of ethylene to propene is between about 0.02 and 50 and preferably between 0.05 and 1.

The polymerization of the above-mentioned olefins, and especially of the $C_2$–$C_{12}$ monoolefins, taken alone or as mixtures, as was indicated above, by means of the catalyst system as defined above may be carried out in solution or suspension in an inert liquid medium, and especially in an aliphatic hydrocarbon such as n-heptane, n-hexane, isobutane or in bulk in at least one of the olefins to be polymerized which is maintained in the liquid or hypercritical state.

The operating conditions, specifically the temperatures, pressures and the quantity of the catalyst system for these liquid-phase polymerizations are those commonly proposed in similar cases involving the use of conventional Ziegler Natta-type catalyst systems with or without support.

For example, in the case of suspension or solution polymerization in an inert liquid medium, it is possible to operate at temperature up to 250° C. and under pressures ranging from atmospheric pressure to 250 bar. In the case of polymerization in a liquid propene medium, the temperatures may range from atmospheric pressure to 50 bar. In the case of bulk polymerization or copolymerization of ethylene, leading to polyethylenes or copolymers with ethylene as the major component, the process can be conducted at temperatures up to 350° C. and under pressures ranging from 200 to 3,500 bar.

The catalyst system obtained by the association of the transition metal component according to the present invention with a cocatalyst and possibly with an electron donor as defined above may also be used for the gas-phase polymerization of the above-mentioned olefins or olefin mixtures. In particular, it is possible to polymerize, in the gaseous phase, in contact with the said catalyst system, a mixture of ethylene with one or several $C_3$–$C_{12}$ alpha-olefins, such as propene, 1-butene, 1-hexene, 4-methyl-1-pentene and 1-octene, which contain, when in contact with the catalyst system, a molar quantity of $C_3$–$C_{12}$ alpha-olefin or alpha-olefins between about 0.1 and 90% and preferably between 1 and 60% to produce an ethylene/alpha-olefin copolymer in which the $C_3$–$C_{12}$ alpha-olefin is the minority component which is known as low-density linear polyethylene.

The gas-phase polymerization of the olefin or olefins in contact with the catalyst system can be carried out in any reactor, which permits a gas-phase polymerization, and especially in an agitated-bed or fluidized-bed reactor. The gas-phase polymerization conditions, especially the temperature, pressure, the injection of the olefin or olefins into the agitated-bed or fluidized-bed reactor and the control of the polymerization temperature and condition, are analogous to those proposed according to the prior art for the gas-phase polymerization of olefins. In general, a temperature is used, which is lower than the melting point (m.p.) of the polymer or copolymer to be synthesized and is especially between $-20°$ C. and (m.p. $-5$)° C., and the pressure used is such that the olefin or olefins and possibly the other hydrocarbon monomers present in the reactor are essentially in the vapor phase.

The solution, suspension, bulk or gas-phase polymerization may be carried out in the presence of a chain transfer agent, especially hydrogen or zinc alkyl, such as diethyl zinc, so as to control the melt index of the polymer or copolymer to be prepared. The preferred chain transfer agent is hydrogen, which is used in quantities up to 80%, and preferably in quantities ranging from 0.1 to 40% of the total volume of the olefins plus the hydrogen introduced into the reactor.

The transition metal component according to the present invention may also be used as a transition metal component for preparing the active solid hydrocarbon, which can be used to polymerize olefins, as defined in French Patent Application No. 83 03229.

The transition metal component according to the present invention can also be used to prepare an active prepolymer. It can be used alone or in combination with a cocatalyst selected from among the magnesium compounds of the formula Ya $Mg_m$Xb, isoprenyl aluminum, aluminoxanes, and aluminosiloxane derivatives, as defined by the formula given above, and the organoaluminum compounds of the formula AL(R')$_q$M$_r$H$_s$, to form a catalyst system, which is suitable for use for the bulk polymerization or copolymerization of ethylene, leading to the formation of polyethylene homopolymers or copolymers with ethylene as the major component, such as the copolymers of ethylene with one or several $C_3$–$C_{12}$ alphaolefins, olefins, which are known as low-density linear polyethylenes, by operating under pressures ranging from about 200 to 3,500 bar and preferably from 800 to 2,500 bar and at temperatures up to 350° C.

The said active prepolymer is obtained by contacting one or several $C_4$–$C_{12}$ alpha-olefins with a catalyst system formed by combining the transition metal component according to the present invention with a cocatalyst selected from among the above-mentioned compounds for this purpose, which are used in the proportions previously indicated, the $C_4$–$C_{12}$ olefin or olefins being used in quantities representing 2 to 100 moles and preferably 2 to 50 moles of $C_4$–$C_{12}$ olefin or olefins per gram-atom of the transition metal present in the transition metal component.

The invention will be further described in connection with the following examples which are set forth for purposes of illustration only.

EXAMPLE 1 a) Preparation of the Transition Metal Component

A one-liter reactor equipped with an agitator and a double jacket with a heat-carrying fluid circulating between the said jackets is used to maintain the reactor at the proper temperature.

35 ml of a solution of $(C_4H_9)_3Mg_2(C_2H_5)$ (DBME) in heptane (25 mM) and 25 mM diethyl aluminum dimethylethylsiloxane are introduced into the reactor purged by circulating nitrogen, and a solution is obtained which is maintained under agitation at 80° C. for four hours. After cooling to ambient temperature, one gram of dioctyl phthalate is added, and the mixture is agitated for 18 hours.

The solution is subjected to chlorination by continuously injecting anhydrous HCl (0.5 mole/hour for one hour) into the reactor. A precipitate is obtained, which is separated by filtration and resuspended in heptane. 10 ml pure $TiCl_4$ are added to the suspension obtained, after which the reaction medium is agitated for three hours at ambient temperature. The content of the reactor is then removed, filtered, and the solid fraction collected is dried at 70° C. under a protective nitrogen atmosphere.

The solid obtained, which is the transition metal component according to the present invention, contains 10 wt.% Mg, 0.4 wt.% Ti, and 0.9 wt.% Si.

b) Suspension Polymerization of Ethylene in Contact with a Catalyst System Prepared from the Transition Metal Component A reactor is used which is equipped with an agitator rotating at a speed of 350 rpm; the said reactor is maintained at 80° C. for the entire duration of the polymerization.

After drying and purging with nitrogen, 2.0 liters dry heptane, 6 mmoles triethyl aluminum (cocatalyst) and 100 mg of the titanium component are consecutively introduced into the agitated reactor. $H_2$ under pressure of 5.4 bar and ethylene under a pressure of 5.4 bar are then injected into the reactor, after which the pressure inside the reactor is maintained by injecting additional ethylene. After a reaction time of one hour, the polymerization is stopped by decompressing the reactor, after which 20 ml of a mixture of methanol and HCl containing 10 wt.% HCl are added to the content of the reactor, and the polyethylene formed is collected by filtration of the reaction medium.

The influence of the catalyst on the polymerization is shown in Table I following Example 3.

EXAMPLE 2

The above example is repeated, but the dioctyl phthalate is replaced by one gram of chloranil.

The solid obtained contains:
10.2 wt.% Mg, 0.54 wt.% Ti, and 0.9 wt.% Si.

The polymerization of ethylene is also carried out under the conditions described in Example 1. The influence of the catalyst on the polymerization is shown in Table I following Example 3.

EXAMPLE 3

A one-liter reactor is used which is equipped with an agitator and a double jacket with a heat-carrying fluid circulating between the said jackets to maintain the reactor at the proper temperature.

35 ml of a DBME solution in heptane (25 mM) and 25 mM diethyl aluminum dimethylethylsiloxane are introduced into the reactor purged by circulating nitrogen. A solution is obtained, which is agitated at 80° C. for four hours. After cooling to ambient temperature, the solution is subjected to chlorination by continuously injecting anhydrous HCl (0.5 mole/hour for one hour) into the reactor. A precipitate is obtained which is separated by filtration and resuspended in heptane. 10 ml pure $TiCl_4$ are added to the suspension obtained, after which the reaction medium is maintained at ambient temperature for three hours while stirring. The content of the reactor is then filtered and washed with heptane. After another filtration, the solid is dried at 70° C. under a nitrogen stream. The solid obtained, which is the transition metal component, contains 17.2 wt.% Mg, 2.7 wt.% Si, and 0.6 wt.% Ti.

Ethylene is polymerized under the conditions described in Example 1. The influence of the catalyst on the polymerization is shown in Table I.

TABLE I

|  | Activity | MFR | Density |
|---|---|---|---|
| Example 1 | 3,000 | 33 | 0.960 |
| Example 2 | 4,500 | 32 | 0.954 |
| Example 3 | 7,500 | 29 | 0.958 |

EXAMPLE 4 a) Preparation of a Transition Metal Component on a Polymer Support

A 1.5-liter reactor is used which is equipped with an agitator and a double jacket with a heat-carrying fluid circulating between the said jackets to maintain the reactor at the proper temperature.

50 g of a dried powder of low-density linear polyethylene, degassed with nitrogen, which said powder has a mean particle diameter of 230 microns and a pore volume of 0.2 cm³/g, are introduced into the reactor which was dried and maintained under a nitrogen atomosphere.

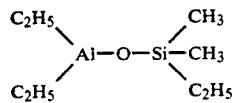

dissolved in 10 cm³ heptane are added to the content of the reactor being agitated at 40° C.

After homogenization for 0.25 hour, the powdery content of the reactor is subjected to scavenging with nitrogen to remove the hexane. 5.5 mM dibutyl magnesium dissolved in 8 cm³ hexane are then added. After homogenization for 0.25 hour, the content of the reactor is scavenged with nitrogen to remove the hexane. 1 mM tetra-n-propyl titanate ($Ti(OR)_4$), dissolved in 10 cm³ heptane, is introduced into the reactor. After homogenization for 0.25 hour, the powdery content of the reactor is scavenged with nitrogen to remove the heptane. 0.1 mole $SiCl_4$ is introduced into the reactor and agitation is maintained for one hour.

Washing is performed by introducing 100 cm³ heptane which is followed by filtration.

The reactor is cooled to ambient temperature, and the mixture is chlorinated by injecting anhydrous HCl, still while stirring, at a rate of 0.6 mole/hour for 60 minutes. The unreacted HCl is removed by scavenging with nitrogen.

Finally, 75 mM tri-n-hexyl aluminum dissolved in 6 cm³ heptane are introduced into the reactor while stirring. After homogenization for 0.25 hour, the content of the reactor is subjected to scavenging with nitrogen to remove the heptane.

A powdery product, which is the transition metal component, is thus obtained; this product has the same particle size as the starting support polymer powder and contains, on a weight basis, 725 ppm Ti, 2,520 ppm Mg, 1,830 ppm Al and 690 ppm Si.

b) Polymerization

Experiments are carried out concerning the preparation of ethylene/1-butene copolymers in gaseous phase in the presence of the catalyst system.

The copolymerization is carried out in an eight-liter agitated reactor containing 100 g polyethylene charge degassed and purged with nitrogen.

The following components are consecutively added at 85° C. while stirring:

1-butene, absolute pressure 2 bar, 1 cm³ pure trihexyl aluminum (THA), $H_2$, absolute pressure 1.5 bar and ethylene, 13.5 bar.

The catalyst is charged into the reactor while stirring with nitrogen with an absolute pressure of 4 bar to reach a total absolute pressure of 21 bar. The reaction starts immediately, and the pressure maintained at a constant level by feeding the reactor with a 1-butene/ethylene mixture of 0.0466 mole.

c) Operating Conditions

Weight of the catalyst used in grams:5
Polyethylene charge in the reactor in grams:100
Cocatalyst injected (cm³ pure THA):1
Polymerization time in hours:4 d) Polymerization Results

Copolymer produced in grams:771
Productivity, g PE/G catalyst:154
Productivity, g PE/g Ti:211,000
Apparent density (AD), nonpacked, g/cm³:0.30
Particle diameter at 50% of the cumulative distribution curve (Dp 50) in microns:1,130
$MI_2$:1.4
MFR=MI 21.6/MI 2.16:28.2
Density:0.922
Number of ethyl branches per 1,000 carbon atoms ($C_2H_5$/1,000 C.):18.1

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for preparing a transition metal component for a catalyst system for the polymerization of olefins, comprising reacting, in a liquid medium, a monohalogenated, alkylated or alkoxylated compound of magnesium with at least one organoaluminum compound at a temperature and for a time sufficient to form an organic magnesium-aluminum reaction product, and subjecting said reaction product to chlorination and reaction with a compound of a transition metal selected from TI, V, Zr, or CR to form said transition metal component; said organoaluminum compound used being an aluminosiloxane deriative of the formula

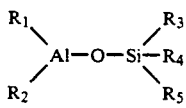

in which $R_1$, $R_2$, $R_3$, $R_4$, and $R_5$, can be identical or different, and each is a $C_1$-$C_{12}$ alkyl radical, or H.

2. The process of claim 1, wherein $R_1$, $R_2$, $R_3$, $R_4$, and $R_5$ each represents a $C_1$-$C_6$ alkyl radical.

3. The process of claim 2, wherein said alumino siloxane derivative contains not more than two hydrogen atoms per mole thereof.

4. The process of claim 3, wherein the magnesium compound corresponds to the formula Ya $Mg_m$ Xb, in which Y is a $C_1$-$C_{12}$ alkyl or alkoxy radical, X is a radical Y or a halogen atom, m is a number equal to or greater than one, while a is greater than 0 so that a+b=2 m.

5. The process of claim 4, wherein the quantities of the magnesium compound and the aluminosiloxane derivative used in the reaction are such that the ratio of the number of moles of the magnesium compound to the number of moles of the aluminosiloxane derivative is between about 0.1 and 100.

6. The process of claim 5, wherein the reaction of the magnesium compound with the aluminosiloxane derivative is carried out at temperatures ranging from about −40° C. to the boiling point of the liquid reaction medium under atmospheric pressure.

7. The process of claim 6, wherein the reaction product of the magnesium compound with the aluminosiloxane derivative is first subjected to chlorination, after which the product resulting from the said chlorination is treated with a transition metal compound.

8. The process of claim 6, wherein the reaction product of the magnesium compound with the aluminosiloxane derivative is first treated with a transition metal compound, after which the product resulting from the said treatment is subjected to chlorination.

9. The process of claim 7 or 8, wherein a porous inorganic or organic support is impregnated with the reaction product of the magnesium compound with the aluminosiloxane derivative, the said impregnation being carried out during the formation of the reaction medium for the said compounds, or in the course of the reaction, or when the reaction is complete.

10. The process of claim 7, wherein the product resulting from the chlorination is dissolved in a solvent, after which a porous inorganic or organic support is impregnated with the said solution, and the impregnated support is treated with the transition metal compound.

11. The process of claim 8, wherein a porous inorganic or organic support is impregnated with the reaction medium obtained after the treatment with the transition metal compound before chlorination.

12. The process of claim 7 or 8, wherein the product obtained at the end of the stage of chlorination and at the end of the stage of treatment with the transition metal compound, which is the last stage of the process, is combined with a porous inorganic or organic support.

13. The process of claim 7 or 8, wherein the product obtained after the stages of chlorination and treatment with the transition metal compound is dissolved in a solvent, and a porous inorganic or organic support is impregnated with the said solution.

14. The process of claim 10 or 11, wherein the support is selected from $SiO_2$, $TiO_2$, $Al_2O_3$, $ZrO_2$, zeolites, or mixed oxides containing $SiO_2$ and one or several metal oxides selected from $ZrO_2$, $TiO_2$, MgO, $Al_2O_3$, or thermoplastic polymers.

15. The process of claim 7, 8, 10 or 11, wherein the chlorination is carried out at temperatures ranging from about 0° C. to 100° C.

16. The process of claim 7, 8, 10, or 11, wherein the chlorinating agent is selected from chlorine, $SOCl_2$, $SiCl_4$, or anhydrous HCl, or chlorinated hydrocarbons.

17. The process of claim 7, 8, 10, or 11, wherein the treatment with the transition metal compound is carried out at a temperature of from about −40° C. to 200° C.

18. The process of claim 7, 8, 10, or 11, wherein the transition metal compound used for the treatment is selected from $TiCl_4$, $TiCl_3$, $VCl_4$, $VOCl_3$, $CrCl_3$, $CrO_3$, chromium acetylacetonate, vanadium acetylacetonate, or the titanates and zirconates of the formulas Ti-$(OR)_pCl(4-p)$ and $Zr(OR)_pCl(4-p)$, in which R is a $C_1$-$C_8$ alkyl radical and p is an integer ranging from 1 to 4.

19. The process of claim 1, 2, 3, 4, 5, 6, 7, 8, 10, or 11, wherein an electron donor consisting of a Lewis base, is added to the transition metal component either at the end of the preparation of the latter or at any point of time during its process of preparation in an amount such that the ratio of the number of magnesium atoms of the transition metal component to the number of electron donor molecules is between about 0.5 and 200.

20. The process of claim 1, 2, 3, 4, 5, 6, 7, 8, 10, or 11, wherein the quantity of the transition metal compound used is such that the transition metal component contains about 0.01 to 40 wt.% transition metal.

21. An olefin polymerization catalyst system comprising a transition metal component prepared according to any one of claims 1 to 8, 10, or 11 and a cocatalyst selected from organometallic compounds of a metal of Groups I through III of the Periodic Table of the Elements.

22. The catalyst system of claim 21, wherein said transition metal component and the cocatalyst are associated with each other in a proportion such that the ratio of the number of atoms of the metal of Groups I through III of the Periodic Table of the Elements which are present in the cocatalyst to the number of transition metal atoms contained in the said component is between about 0.5 and 1,000.

23. The catalyst system of claim 22, wherein the cocatalyst is selected from isoprenyl aluminum, aluminoxanes, organomagnesium compounds of the formula $Y_a Mg_m X_b$, in which Y is a $C_1$-$C_{12}$ alkyl or alkoxy radical, X is a radical Y or a halogen atom, m is a number equal to or greater than one, while a is greater than 0 so that $a+b=2m$, organoaluminum compounds of the formula $AlR'''_xCl_{(3-x)}$, in which $R'''$ is a $C_1$-$C_8$ alkyl radical and x is a number such that $1 \leq x \leq 3$, or aluminosiloxane derivatives of the formula

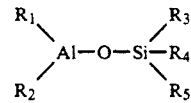

in which $R_1$, $R_2$, $R_3$, $R_4$, and $R_5$, can be identical or different, and each is a $C_1$-$C_{12}$ alkyl radical, or H.

24. The catalyst system of claim 23, wherein it is formed by an active prepolymer prepared by contacting at least one $C_4$-$C_{12}$ alpha-olefin with a catalyst system resulting from the association of the transition metal component with one or several of the said cocatalysts, using 2 to 100 moles $C_4$-$C_{12}$ alpha-olefin per gram-atom of the transition metal present in the transition metal component, or from the association of the said active prepolymer with at least one of the said cocatalysts.

* * * * *

UNITED STATES PATENT OFFICE
CERTIFICATE OF CORRECTION

Patent No. 5,075,270                    Dated   December 24, 1991

Inventor(s)   Brun, et al

It is certified that error appears in the above-identified patent and that said Letters Patent is hereby corrected as shown below:

Column 11, line 15, cancel "TI" and substitute therefor -- Ti --;
line 15, cancel "CR" and substitute therefor -- Cr --.

Column 11, lines 28 and 29, cancel "alumino" and "siloxane" and substitute therefor -- aluminosiloxane --.

Signed and Sealed this

Twenty-seventh Day of April, 1993

Attest:

MICHAEL K. KIRK

Attesting Officer          Acting Commissioner of Patents and Trademarks